United States Patent Office 2,698,513
Patented Jan. 4, 1955

2,698,513

PARAFFIN HYDROCARBON FUEL FOR AND METHOD OF OPERATING PULSE-JET ENGINES

Sylvester C. Britton and Robert M. Schirmer, Bartlesville, Okla., assignors to Phillips Petroleum Company, a corporation of Delaware No Drawing. Application December 29, 1947,
Serial No. 794,427

43 Claims. (Cl. 60—35.4)

This invention relates to jet engine fuel. In one of its more specific aspects it relates to improved pulse jet engine fuel. In another of its more specific aspects it relates to a method for operating pulse jet engines.

A pulse jet engine is an intermittent, compressorless, aerodynamic power plant. The engine is composed of a shaped tube fitted with one-way flow check valves at the forward end. Unlike typical reciprocating internal combustion engines the problem of knocking is not one of the difficulties of operation. In diesel engines, which are classified as compression ignition engines, the difficulty of attaining constant pressure heat addition presents a problem of high importance. The problem presented in the operation of the pulse jet engine is, however, diametrically opposite. It is desirable in the operation of a pulse jet engine to attain the most rapid possible pressure rise. It is thus desirable to provide a fuel for a pulse jet engine which will have the shortest possible burning time, the greatest combustion heat output, and one which will produce the greatest forward thrust.

The pulse jet engine comprises few or none of the mechanical features of stationary power plants. The engine is, as above stated, composed of a shaped tube fitted with one-way check valves at the forward end. Some conventional valves comprise thin sheets of spring metal which are attached so as to close on metal seats. The tube is so constructed that air flows successively through an entrance venturi, past the flow check valves and a valve blade shield into a cylindrical combustion zone of fixed size. The engine is started by forcing air through a mixture zone where fuel and air are mixed. The fuel-air mixture is then introduced into the primary combustion zone. Initial ignition for the fuel is provided by a spark producing attachment, such as a conventional spark plug mounted in the wall of the combustion chamber. The resulting explosion closes the flow check valves, thus preventing continuous combustion of fuel which is continuously injected into admixture with air in a mixing zone ahead of the primary combustion zone. The explosion forces the combustion gases outwardly through a transition cone and a tail pipe, exhausting to the atmosphere. Inertia effects of the gases in the tail pipe cause the portion of combustion gas remaining in the combustion zone to expand below the pressure of the surrounding atmosphere. Pressure of the air and fuel charge, which exceeds the reduced pressure within the combustion zone, causes the flow check valves to open so as to allow the passage of another charge of fuel and air into the primary combustion zone. The fuel is thought to be ignited by heat from the hot combustion gases remaining in the combustion zone. The cycle comprising fuel-air injection, combustion and exhaust repeats itself with a frequency of from 30 to 400 cycles per second depending upon the size of unit, valve design, fuel, and other factors. Once started, the operation proceeds without necessity of ram air or operation of a spark producing attachment.

An object of the invention is to provide an improved fuel for use in pulse jet engines. Another object is to provide a fuel which ignites with the least possible delay. Another object is to provide a fuel which burns with the greatest possible efficient heat output. Another object is to provide a fuel which has a high rate of flame propagation. Another object is to provide an improved method for operating pulse jet engines. Another object is to provide a pulse jet engine fuel which will give a maximum of thrust per unit of fuel consumed. Other and further objects and advantages will be apparent upon study of the accompanying discussion and the claims.

From a consideration of the basic principles of operation of a pulse jet engine it is quite evident that the more rapid the rate of combustion the easier the engine will start. That result probably occurs because of the fact that an explosion of considerable violence must take place in order to create a low pressure area in the combustion chamber and thus start the series of intermittent pulsations necessary for engine operation.

In addition to the fact that it is desirable that the rate of combustion of the fuel should be explosive, we have discovered that best operating results are obtained when the fuel also has a high heat release, but not so high that it substantially reduces valve life. A high heat release will result in greater expansion of the combustion gas which results from the burning of the fuel. A greater intensity of shock wave is thus obtained by increasing the volume of combustion gas which is exhausted from the combustion chamber and thus in turn increases the thrust effect of the escaping gas.

We have discovered that hydrocarbons which are not generally used as fuels for reciprocating internal combustion engines may be used with excellent effect in the operation of pulse jet engines. Normal paraffins boiling in the range between 90° F. and about 500° F. furnish those characteristics of high heat release found to be so desirable in pulse jet fuels. It is preferred to use those normal paraffins as a pulse jet fuel which boil in the range of between 150° F. and 350° F. Normal paraffins boiling between 350° F. and 500° F. may be satisfactorily utilized as pulse jet fuels by properly atomizing the fuel before its injection into the primary combustion zone for burning. Though normal paraffins boiling within the range of between about 90° F. and 150° F. have a relatively high heat release and may be utilized efficiently in the operation of a pulse jet engine, we have found that such a fuel is more injurious to and shortens the life of the flow check valves more than does a fuel comprising hydrocarbons selected from a boiling range of 150° F. to 350° F.

For the most efficient pulse jet engine operation we have found that a fuel comprising a hydrocarbon stock which contains between 85 per cent and 90 per cent by volume of normal paraffins boiling within our preferred boiling range are highly superior. A fuel comprising essentially a hydrocarbon stock containing between 50 per cent and 90 per cent by volume of normal paraffins in the finished fuel, said normal paraffins boiling within our preferred boiling range, may be used with excellent results in the operation of such engines. A fuel comprising a hydrocarbon stock containing between 50 and 90 volume per cent normal paraffins boiling in the range of between 90° F. and 500° F. will also give superior performance.

At times it may be necessary to operate a pulse jet engine for a comparatively long period of time while at the same time having a rather limited fuel capacity. Under such conditions the desired length of time for operation of a pulse jet engine, together with the shortage of fuel capacity space, may outweigh a desire for the highest efficiency of operation in the determination of a fuel mixture for the pulse jet engine. Aromatics or substituted aromatics boiling in the range of between 175° F. and 350° F. have a high heat release per unit volume. Inasmuch as it may be desirable to get the greatest economical amount of heat release from a limited fuel load it may be desirable to mix selected aromatics boiling within the above boiling range with normal paraffins boiling within the above designated ranges. A fuel mixture which comprises a hydrocarbon stock containing between 50 per cent and 90 per cent by volume of normal paraffins boiling in the ranges of 150° F. to 350° F. or 90° F. to 500° F. together with 10 per cent to 50 per cent by volume of aromatics boiling in the range of 175° F. to 350° F. provides a high ratio of heat release for a relatively small fuel volume.

Specific normal paraffins which may be utilized for at least 50 per cent by volume of the hydrocarbon stock of a pulse jet engine fuel may include normal pentane, normal hexane, normal heptane, and normal octane. Aromatics such as benzene and toluene and/or substituted aromatics such as cumene may make up the 10 to 50 per cent aromatic portion of the fuel volume.

It is preferred that the composite pulse jet fuel contain substantially no isoparaffinic material. In view of the fact that it is practically impossible to eliminate all isoparaffins in commercial distillation systems, it will usually be found necessary, however, to tolerate up to about 10 per cent by volume of isoparaffins in the finished fuel. Other non-deleterious materials may also go to make up a portion of the finished fuel. Some materials which may be utilized with our preferred fuel are nitro-paraffins, nitro-aromatics, ketones, ethers and alcohols. Such materials may make up as much as 30 per cent by volume of the finished material. It is however preferred to limit those materials to an amount not exceeding 10 per cent by volume of the finished fuel.

One of the major difficulties encountered, when attempting to operate a pulse jet engine, is its resistance to starting. While the fuel may ignite it may not immediately ignite with the explosive force necessary to set up the shock wave which will cause the engine to commence pulsation. We have discovered that starting characteristics and thrust output of a given pulse jet fuel may be improved by the addition of a small portion of aryl or alkyl hydroperoxides. Examples of such additives are cumene hydroperoxide, benzoyl hydroperoxide, and ethyl hydroperoxide. The quantity of this type additive which may be advantageously employed may vary from about 0.1 per cent to about 5 per cent by volume of the finished fuel. It is preferred to utilize not more than about 3 per cent by volume of the additive in the finished fuel because the relatively small incremental benefit for additions above 3 per cent becomes uneconomical.

We have further discovered that starting characteristics and thrust output of a given pulse jet fuel may also be improved by the addition of a small portion of alkyl nitrates, or alkyl nitrites. Examples of such additives are amyl nitrate, ethyl nitrate, isoamyl nitrate, isopropyl nitrate, cyclohexyl nitrate, hexyl nitrate or their corresponding nitrites. The quantity of this type additive which may be advantageously employed may vary from about 0.1 per cent to about 5 per cent by volume of the finished fuel. It is once again preferred to limit the quantity of the additive to not more than 3 per cent by volume of additive in the finished fuel because of the relatively small incremental benefit for additions above 3 per cent. It is also possible to improve the starting characteristics of a given fuel by using a mixture of alkyl nitrates and hydroperoxides in a quantity ranging between 0.1 per cent to about 5 per cent by volume of the finished fuel.

Pulse jet engines are operated with the greatest efficiency when the fuels discussed hereinbefore are supplied to a given engine at fuel-air ratios ranging between .01 and .08. It is within the scope of this invention to operate a pulse jet engine with our preferred fuel mixed with oxygen. If oxygen or an oxygen-supplying compound, such as a peroxide, is used rather than another oxygen-supplying gas, such as air, the fuel-air ratios would necessarily have to be adjusted accordingly so as to maintain a fuel-oxygen ratio equivalent to the fuel-air ratio disclosed herein. It is preferred to operate a pulse jet engine by supplying the fuel to such an engine at a fuel-air ratio ranging between .03 and .07. Much difficulty is encountered in attempting to measure the exact amount of air actually supplied to a pulse jet engine because of the fact that up to about 30 per cent by volume of air may enter the combustion zone through the engine tail pipe or exhaust zone. A given pulse jet engine may be operated in a range of between 30 and 400 cycles per second, depending upon the size of the engine. Progressively larger engines operate at progressively lower cycle rates. By the term "cycle" we mean to include the steps of introducing the fuel-air charge into a primary combustion zone and igniting the fuel charge so as to produce an explosion which in turn produces a shock wave. The shock wave closes the flow check valves ahead of the flame front, thus preventing the flame from following the fuel-air mixture into the mixing zone, and carries a portion of the combustion gas out of the combustion zone through an exhaust zone from which it is exhausted to the surrounding atmosphere. Inertia of the combustion gas passing from the combustion zone causes a decrease in pressure of the gas remaining within the combustion zone to a pressure below that of the surrounding atmosphere. Pressure of the surrounding atmosphere which is greater than the reduced pressure in the combustion zone causes the flow check valves to open, thus permitting another charge of fuel-air mixture to flow into the primary combustion zone and thus starting another cycle. The fuel-air mixture is thought to be ignited by heat from the combustion gas remaining in the combustion zone though there are other theories as to just what causes the fuel charge to ignite. Another cycle of intermittent operation of the engine is thus begun. As has been pointed out above, it is highly desirable to get the greatest possible heat release from a given pulse jet engine without substantially shortening the valve life of the engine. Operation of pulse jet engines at the above mentioned conditions will result in a "temperature rise" in the engine which may range from about 800° F. to about 4500° F. By "temperature rise" we mean that rise of temperature taken between the inlet end of the engine and ranging to the highest temperature of the gas passing from the engine tail pipe or exhaust zone.

Advantages of using the above described fuel in the operation of a pulse jet engine will be obvious upon study of the following specific examples. Fuel proportions used in these specific examples are merely exemplary and should not be construed to unduly limit the invention.

SPECIFIC EXAMPLES

Various fuels were tested to determine thermal efficiency and operating life of valve elements. The tests were conducted on a thrust stand using two different representative pulse jet engines. Results of the tests are indicated below in Tables I and II.

TABLE I

*Effect of various fuels on thermal efficiency and valve blade life in engine A*

| Fuel | Maximum Thrust Lbs. | Fuel Flow For Max. Thrust, Lbs./Hr. | Thrust Specific Fuel Consumption, Lbs./Hr./Lb. | Relative Valve Blade Life |
|---|---|---|---|---|
| (1) Normal Heptane | 3.70 | 10.60 | 2.87 | 25 |
| (2) Unleaded Gasoline | 3.30 | 9.95 | 3.00 | 15 |
| (3) Iso Octane | 3.10 | 9.50 | 3.06 | 05 |

TABLE II

*Effect of various fuels on thermal efficiency and valve blade life in engine B*

| Fuel | Maximum Thrust, Lbs. | Fuel Flow For Max. Thrust, Lbs./Hr. | Thrust Specific Fuel Consumption, Lbs./Hr./Lb. | Relative Valve Blade Life |
|---|---|---|---|---|
| (1) Normal Pentane [1] | 3.04 | 10.30 | 3.40 | 100 |
| (2) Normal Heptane [1] | 2.95 | 9.67 | 3.28 | 125 |
| (3) Precipitation Naphtha [1] | 2.87 | 9.70 | 3.38 | 125 |
| (4) 40% Normal Heptane in Iso Octane | 2.80 | 9.40 | 3.35 | 50 |
| (5) Unleaded Gasoline | 2.80 | 9.45 | 3.38 | 25 |
| (6) Dry Cleaner Naphtha | 2.80 | 10.50 | 3.75 | 25 |
| (7) Stove and Lamp Fluid | 2.70 | 9.60 | 3.55 | 25 |
| (8) Stoddard Solvent | 2.66 | 10.50 | 3.95 | 75 |
| (9) Benzene | 3.08 | 11.10 | 3.60 | 50 |

[1] These fuels predominately comprise normal paraffins (85 per cent or more); other fuels contain appreciably greater quantities of isoparaffins, olefins, cycloparaffins, and aromatics.

Comparison of the relative valve blade life of the two engines discloses the fact that though the valve blade life in engine "A" is much lower than in engine "B" in each engine the best comparative valve life is obtained while using normal heptane as the fuel.

Various fuels were tested to determine their starting and performing characteristics. Appreciable improvements in starting characteristics together with noticeable increases in thrust output were obtained by the addition of small quantities of alkyl nitrate. These tests were conducted on a thrust stand using a representative pulse jet engine. The results of these tests were recorded in Table III shown below.

TABLE III

*Effect of the addition of alkyl nitrate on the starting and performance characteristics of various fuels*

| Fuel | Maximum Thrust, Lbs. | Fuel Flow For Max. Thrust, Lbs./Hr. | Thrust Specific Fuel Consumption, Lb./Hr./Lb. | Time to Start, Minutes |
|---|---|---|---|---|
| (1) Normal Heptane | 2.95 | 9.67 | 3.28 | 3.0 |
| (2) Normal Heptane plus 1% Amyl Nitrate | 2.97 | 9.60 | 3.23 | 0.3 |
| (3) 40% Normal Heptane in Iso Octane | 2.80 | 9.40 | 3.35 | 5.0 |
| (4) 40% Normal Heptane in Iso Octane plus 1% Amyl Nitrate | 2.87 | 9.60 | 3.34 | 0.3 |

Tests were carried out to determine the starting and performance characteristics of normal heptane. Appreciable improvement in starting characteristics together with a noticeable increase in thrust output was obtained by the addition of a small quantity of aryl hydroperoxide. These tests were conducted on a thrust stand using a representative pulse jet engine. The results of the tests are recorded in Table IV, shown below.

TABLE IV

*Effect of the addition of aryl hydroperoxide on the starting and performance characteristics of various fuels*

| Fuel | Maximum Thrust, Lbs. | Fuel Flow For Max. Thrust, Lbs./Hr. | Thrust Specific Fuel Consumption, Lb./Hr./Lb. | Time to Start, Minutes |
|---|---|---|---|---|
| (1) Normal Heptane | 2.95 | 9.67 | 3.28 | 3.0 |
| (2) Normal Heptane plus 2.5% Cumene Hydroperoxide | 2.97 | 10.00 | 3.37 | 0.3 |

As will be evident to those skilled in the art, various modifications of the invention can be made or followed in the light of the foregoing disclosure and discussion without departing from the spirit or scope of the disclosure or from the scope of the claims.

We claim:

1. An improved method for operating a pulse jet engine which comprises the steps of introducing a fuel, comprising essentially a hydrocarbon stock having not more than 10 per cent by volume of isoparaffins and containing at least 50 per cent by volume normal paraffins boiling in the range of between 90° F. and 500° F., with air in a fuel-air ratio between .01 and .08 into the forward portion of a primary combustion zone of fixed size; igniting said fuel mixture, whereby a shock wave is produced by the resulting explosion; exhausting the resulting combustion gas through an exhaust zone; and intermittently repeating the cycle of fuel-air injection, combustion, and exhaust at a rate of between 30 and 400 cycles per second so as to produce a temperature rise in said engine ranging between 800° F. and 4500° F.

2. An improved method for operating a pulse jet engine which comprises the steps of introducing a fuel, comprising essentially a hydrocarbon stock having not more than 10 per cent by volume of isoparaffins and containing between 50 per cent and 90 per cent by volume normal paraffins boiling in the range of between 90° F. and 500° F. with between 10 per cent and 50 per cent by volume aromatics boiling between 175° F. and 350° F. and air in a fuel-air ratio between .01 and .08 into the forward portion of a primary combustion zone of fixed size; igniting said fuel mixture, whereby a shock wave is produced by the resulting explosion; exhausting resulting combustion gas through an exhaust zone; and intermittently repeating the cycle of fuel-air injection, combustion, and exhaust at a rate of between 30 and 400 cycles per second so as to produce a temperature rise in said engine ranging between 800° F. and 4500° F.

3. An improved method for operating a pulse jet engine which comprises the steps of introducing a fuel, comprising essentially a hydrocarbon stock having not more than 10 per cent by volume of isoparaffin and containing at least 50 per cent by volume normal paraffins boiling in the range of between 90° F. and 500° F., together with from 0.1 per cent to 5 per cent by volume of additive material selected from the group consisting of alkyl hydroperoxides, aryl hydroperoxides, alkyl nitrates and alkyl nitrites and air in a fuel-air ratio between .01 and .08 into the forward portion of a primary combustion zone of fixed size; igniting said fuel mixture, whereby a shock wave is produced by the resulting explosion; exhausting resulting combustion gas through an exhaust zone; and intermittently repeating the cycle of fuel-air injection, combustion, and exhaust at a rate of between 30 and 400 cycles per second so as to produce a temperature rise in said engine, ranging between 800° F and 4500° F.

4. A new fuel composition comprising essentially a hydrocarbon stock having not more than 10 per cent by volume of isoparaffins and containing at least 50 per cent by volume of normal paraffins boiling in the range of between 150° F. and 350° F.; and from 0.1 per cent to 5 per cent by volume of additive material selected from the group consisting of alkyl hydroperoxides, aryl hydroperoxides, alkyl nitrates and alkyl nitrites.

5. A new fuel composition comprising essentially a hydrocarbon stock having not more than 10 per cent by volume of isoparaffins and containing between 50 per cent and 90 per cent by volume normal paraffins boiling in the range of between 150° F. and 350° F.; between 10 per cent and 50 per cent aromatics boiling between 175° F. and 350° F.; and from 0.1 per cent to 5 per cent by volume, based upon total fuel composition, of additive material selected from the group consisting of alkyl hydroperoxides, aryl hydroperoxides, alkyl nitrates and alkyl nitrites.

6. The fuel of claim 5, wherein said normal paraffins consist of normal hexane.

7. The fuel of claim 5, wherein said normal paraffins consist of normal heptane.

8. The fuel of claim 5, wherein said normal paraffins consist of a mixture of at least two normal paraffins boiling within the range of between 150° F. and 350° F.

9. In a method of operating a jet engine having a combustion zone of fixed size which is constantly open at its rear end and which is so adapted at the forward portion as to allow the passage of fuel and air thereinto, wherein said fuel is ignited; the improvement which comprises supplying as the fuel for said engine a fuel comprising essentially a hydrocarbon stock having not more than 10 per cent by volume of isoparaffins and containing at least 50 per cent by volume normal paraffins boiling in the range of between 90° F. and 500° F., in a fuel-air ratio between .01 and .08.

10. In a method of operating a jet engine having a combustion zone of constant size which is constantly open at its rear end and which is so adapted at the forward portion as to allow the passage of fuel and air thereinto, wherein said fuel is ignited; the improvement which comprises supplying as the fuel for said engine a fuel comprising essentially a hydrocarbon stock having not more than 10 per cent by volume of isoparaffins and containing between 50 per cent and 90 per cent by volume normal paraffins boiling in the range of between 90° F. and 500° F. with between 10 per cent and 50 per cent by volume aromatics boiling between 175° F. and 350° F., in a fuel-air ratio between .01 and .08.

11. A fuel for use in jet engines in which the oxygen required for combustion of the fuel is supplied by air, said fuel consisting essentially of a liquid hydrocarbon composition containing 50 per cent by volume of aromatic hydrocarbons and 0.1 to 5 per cent by volume of cumene hydroperoxide.

12. A fuel for use in jet engines in which the oxygen required for combustion of the fuel is supplied by air, said fuel consisting essentially of a liquid hydrocarbon composition and 0.1 to 5 per cent by volume of cumene hydroperoxide.

13. A fuel for use in jet engines in which the oxygen required for combustion of the fuel is supplied by air, said fuel consisting essentially of a liquid hydrocarbon composition comprising aromatic hydrocarbons and 0.1 to 5 per cent by volume of cumene hydroperoxide.

14. A method of operating a jet engine which comprises supplying to said engine under operating conditions air and a fuel consisting essentially of a liquid hydrocarbon composition containing 50 per cent by volume of aromatic hydrocarbons and 0.1 to 5 per cent by volume of cumene hydroperoxide.

15. A method of operating a jet engine which comprises supplying to said engine under operating conditions air and a fuel consisting essentially of a liquid hydrocarbon composition and 0.1 to 5 per cent by volume of cumene hydroperoxide.

16. A method of operating a jet engine which comprises supplying to said engine under operating conditions air and a fuel consisting essentially of a liquid hydrocarbon composition comprising aromatic hydrocarbons and 0.1 to 5 per cent by volume of cumene hydroperoxide.

17. An improved method for operating a pulse jet engine which comprises the steps of introducing a fuel, comprising essentially a hydrocarbon stock having not more than 10 per cent by volume of isoparaffins and containing at least 50 per cent by volume normal paraffins boiling in the range of between 150° F. and 350° F., with air in a fuel-air ratio betwen .03 and .07, into the forward portion of a primary combustion zone of fixed size; igniting said fuel, whereby a shock wave is produced by the resulting explosion; exhausting the resulting combustion gas through an exhaust zone; and intermittently repeating the cycle of fuel-air injection, combustion, and exhaust at a rate between 30 and 400 cycles per second so as to produce a temperature rise in said engine ranging between 800° F. and 4500° F.

18. An improved method for operating a pulse jet engine which comprises the steps of introducing a fuel, comprising essentially a hydrocarbon stock having not more than 10 per cent by volume of isoparaffins and containing at least 50 per cent by volume normal heptane, with air in a fuel-air ratio between .03 and .07 into the forward portion of a primary combustion zone of fixed size; igniting said fuel, whereby a shock wave is produced by the resulting explosion exhausting the resulting combustion gas through an exhaust zone; and intermittently repeating the cycle of fuel-air injection, combustion, and exhaust at a rate between 30 and 400 cycles per second so as to produce a temperature rise in said engine ranging between 800° F. and 4500° F.

19. An improved method for operating a pulse jet engine which comprises the steps of introducing a fuel, comprising essentially a hydrocarbon stock having not more than 10 per cent by volume of isoparaffins and containing at least 50 per cent by volume normal hexane, with air in a fuel-air ratio between .03 and .07 into the forward portion of a primary combustion zone of fixed size; igniting said fuel, whereby a shock wave is produced by the resulting explosion; exhausting the resulting combustion gas through an exhaust zone; and intermittently repeating the cycle of fuel-air injection, combustion, and exhaust at a rate between 30 and 400 cycles per second so as to produce a temperature rise in said engine ranging between 800° F. and 4500° F.

20. An improved method for operating a pulse jet engine which comprises the steps of introducing a fuel, comprising essentially a hydrocarbon stock having not more than 10 per cent by volume of isoparaffins and containing at least 50 per cent by volume normal paraffins boiling in the range of between 150° F. and 350° F., with oxygen in a fuel-oxygen ratio equivalent to a fuel-air ratio between .01 and .08 into the forward portion of a primary combustion zone of fixed size; igniting said fuel, whereby a shock wave is produced by the resulting explosion; exhausting the resulting combustion gas through an exhaust zone; and intermittently repeating the cycle of fuel-air injection, combustion, and exhaust at a rate between 30 and 400 cycles per second so as to produce a temperature rise in said engine ranging between 800° F. and 4500° F.

21. An improved method for operating a pulse jet engine which comprises the steps of introducing a fuel, comprising essentially a hydrocarbon stock having not more than 10 per cent by volume of isoparaffins and containing between 50 per cent and 90 per cent by volume normal paraffins boiling in the range of between 150° F. and 350° F. with between 10 per cent and 50 per cent by volume aromatics boiling between 175° F. and 350° F. and air in a fuel-air ratio between .03 and .07 into the forward portion of a primary combustion zone of fixed size; igniting said fuel mixture, whereby a shock wave is produced by the resulting explosion; exhausting resulting combustion gas through an exhaust zone; and intermittently repeating the cycle of fuel-air injection, combustion, and exhaust at a rate of between 30 and 400 cycles per second so as to produce a temperature rise in said engine ranging between 800° F. and 4500° F.

22. An improved method for operating a pulse jet engine which comprises the steps of introducing a fuel, comprising essentially a hydrocarbon stock having not more than 10 per cent by volume of isoparaffins and containing between 50 per cent and 90 per cent by volume normal heptane with between 10 per cent and 50 per cent by volume aromatics boiling between 175° F. and 350° F. and air in a fuel-air ratio between .03 and .07 into the forward portion of a primary combustion zone of fixed size; igniting said fuel mixture, whereby a shock wave is produced by the resulting explosion; exhausting resulting combustion gas through an exhaust zone; and intermittently repeating the cycle of fuel-air injection, combustion, and exhaust at a rate of between 30 and 400 cycles per second so as to produce a temperature rise in said engine ranging between 800° F. and 4500° F.

23. An improved method for operating a pulse jet engine which comprises the steps of introducing a fuel, comprising essentially a hydrocarbon stock having not more than 10 per cent by volume of isoparaffins and containing between 50 per cent and 90 per cent by volume normal hexane with between 10 per cent and 50 per cent by volume aromatics boiling between 175° F. and 350° F. and air in a fuel-air ratio between .03 and .07 into the forward portion of a primary combustion zone of a fixed size; igniting said fuel mixture, whereby a shock wave is produced by the resulting explosion; exhausting resulting combustion gas through an exhaust zone; and intermittently repeating the cycle of fuel-air injection, combustion, and exhaust at a rate of between 30 and 400 cycles per second so as to produce a temperature rise in said engine ranging between 800° F. and 4500° F.

24. The method of claim 9 wherein said normal paraffins boil in the range of between 150° F. and 350° F.

25. The method of claim 10 wherein said normal paraffins boil in the range of between 150° F. and 350° F.

26. An improved method for operating a pulse jet engine which comprises the steps of introducing a fuel, comprising essentially a hydrocarbon stock having not more than 10 per cent by volume of isoparaffins and containing at least 50 per cent by volume normal paraffins boiling in the range of between 90° F. and 500° F., together with from 0.1 per cent to 5 per cent by volume of an alkyl hydroperoxide, and air in a fuel-air ratio between .01 and .08 into the forward portion of a primary combustion zone of fixed size; igniting said fuel mixture, whereby a shock wave is produced by the resulting explosion; exhausting resulting combustion gas through an exhaust zone; and intermittently repeating the cycle of fuel-air injection, combustion, and exhaust at a rate of between 30 and 400 cycles per second so as to produce a temperature rise in said engine, ranging between 800° F. and 4500° F.

27. An improved method for operating a pulse jet engine which comprises the steps of introducing a fuel, comprising essentially a hydrocarbon stock having not more than 10 per cent by volume of isoparaffins and containing at least 50 per cent by volume normal paraffins boiling in the range of between 90° F. and 500° F., together with from 0.1 per cent to 5 per cent by volume of an aryl hydroperoxide, and air in a fuel-air ratio between .01 and .08 into the forward portion of a primary combustion zone of fixed size; igniting said fuel mixture, whereby a shock wave is produced by the resulting explosion; exhausting resulting combustion gas through an exhaust zone; and intermittently repeating the cycle of fuel-air injection, combustion, and exhaust at a rate of between 30 and 400 cycles per second so as to produce a temperature rise in said engine, ranging between 800° F. and 4500° F.

28. An improved method for operating a pulse jet engine which comprises the steps of introducing a fuel, comprising essentially a hydrocarbon stock having not more than 10 per cent by volume of isoparaffins and containing at least 50 per cent by volume normal paraffins boiling in the range of between 90° F. and 500° F., together with from 0.1 per cent to 5 per cent by volume of an alkyl nitrate, and air in a fuel-air ratio between .01 and .08 into the forward portion of a primary combustion zone of fixed size; igniting said fuel mixture, whereby a shock wave is produced by the resulting explosion; exhausting resulting combustion gas through an exhaust zone; and intermittently repeating the cycle of fuel-air injection, combustion, and exhaust at a rate of between 30 and 400 cycles per second so as to produce a temperature rise in said engine, ranging between 800° F. and 4500° F.

29. An improved method for operating a pulse jet engine which comprises the steps of introducing a fuel, comprising essentially a hydrocarbon stock having not more than 10 per cent by volume of isoparaffins and containing at least 50 per cent by volume normal paraffins boiling in the range of between 90° F. and 500° F., together with from 0.1 per cent to 5 per cent by volume of an alkyl nitrite, and air in a fuel-air ratio between .01 and .08 into the forward portion of a primary combustion zone of fixed size; igniting said fuel mixture, whereby a shock wave is produced by the resulting explosion; exhausting resulting combustion gas through an exhaust zone; and intermittently repeating the cycle of fuel-air injection, combustion, and exhaust at a rate of between 30 and 400 cycles per second so as to produce a temperature rise in said engine, ranging between 800° F. and 4500° F.

30. A new fuel composition comprising essentially a hydrocarbon stock having not more than 10 per cent by volume of isoparaffins and containing at least 50 per cent by volume of normal paraffins boiling in the range of between 150° F. and 350° F.; and from 0.1 per cent to 5 per cent by volume of an alkyl hydroperoxide.

31. A new fuel composition comprising essentially a hydrocarbon stock having not more than 10 per cent by volume of isoparaffins and containing at least 50 per cent by volume of normal paraffins boiling in the range of between 150° F. and 350° F.; and from 0.1 per cent to 5 per cent by volume of an aryl hydroperoxide.

32. A new fuel composition comprising essentially a hydrocarbon stock having not more than 10 per cent by volume of isoparaffins and containing at least 50 per cent by volume of normal paraffins boiling in the range of between 150° F. and 350° F.; and from 0.1 per cent to 5 per cent by volume of an alkyl nitrate.

33. A new fuel composition comprising essentially a hydrocarbon stock having not more than 10 per cent by volume of isoparaffins and containing at least 50 per cent by volume of normal paraffins boiling in the range of between 150° F. and 350° F.; and from 0.1 per cent to 5 per cent by volume of an alkyl nitrite.

34. A new fuel composition comprising essentially a hydrocarbon stock having not more than 10 per cent by volume of isoparaffins and containing between 50 per cent and 90 per cent by volume normal paraffins boiling in the range of between 150° F. and 350° F.; between 10 per cent and 50 per cent aromatics boiling 175° F. and 350° F.; and from 0.1 per cent to 5 per cent by volume, based upon total fuel composition, of an alkyl hydroperoxide.

35. A new fuel composition comprising essentially a hydrocarbon stock having not more than 10 per cent by volume of isoparaffins and containing between 50 per cent and 90 per cent by volume normal paraffins boiling in the range of between 150° F. and 350° F.; between 10 per cent and 50 per cent aromatics boiling 175° F. and 350° F.; and from 0.1 per cent to 5 per cent by volume, based upon total fuel composition, of an aryl hydroperoxide.

36. A new fuel composition comprising essentially a hydrocarbon stock having not more than 10 per cent by volume of isoparaffins and containing between 50 per cent and 90 per cent by volume normal paraffins boiling in the range of between 150° F. and 350° F.; between 10 per cent and 50 per cent aromatics boiling 175° F. and 350° F.; and from 0.1 per cent to 5 per cent by volume, based upon total fuel composition, of an alkyl nitrate.

37. A new fuel composition comprising essentially a hydrocarbon stock having not more than 10 per cent by volume of isoparaffins and containing between 50 per cent and 90 per cent by volume normal paraffins boiling in the range of between 150° F. and 350° F.; between 10 per cent and 50 per cent aromatics boiling 175° F. and 350° F.; and from 0.1 per cent to 5 per cent by volume, based upon total fuel composition, of an alkyl nitrite.

38. The method of claim 9 wherein said fuel contains from 0.1 per cent to 5 per cent by volume of additive material selected from the group consisting of alkyl hydroperoxides, aryl hydroperoxides, alkyl nitrates and alkyl nitrites.

39. The method of claim 10 wherein said fuel contains from 0.1 per cent to 5 per cent by volume of additive material selected from the group consisting of alkyl hydroperoxides, aryl hydroperoxides, alkyl nitrates and alkyl nitrites.

40. The method of claim 39 wherein said aromatics are selected from the group consisting of benzene, toluene and cumene.

41. The method of claim 40 wherein said aromatic is benzene.

42. The method of claim 40 wherein said aromatic is toluene.

43. The method of claim 40 wherein said aromatic is cumene.

References Cited in the file of this patent

UNITED STATES PATENTS

| Number | Name | Date |
| --- | --- | --- |
| 929,503 | Selden | July 27, 1909 |
| 1,495,501 | Taber et al. | May 27, 1924 |
| 2,142,601 | Bleecker | Jan. 3, 1939 |
| 2,158,050 | Bereslavsky | May 16, 1939 |
| 2,249,461 | Diwoky | July 15, 1941 |
| 2,296,558 | Kokatnur | Sept. 22, 1942 |
| 2,315,057 | Holmes et al. | Mar. 30, 1943 |
| 2,361,054 | Pevere | Oct. 24, 1944 |
| 2,396,566 | Goddard | Mar. 12, 1946 |
| 2,403,972 | Friedman | July 16, 1946 |
| 2,563,305 | Britton et al. | Aug. 7, 1951 |

FOREIGN PATENTS

| Number | Country | Date |
| --- | --- | --- |
| 386,908 | Great Britain | Jan. 26, 1933 |
| 459,924 | Great Britain | Jan. 18, 1937 |
| 920,910 | France | Jan. 8, 1947 |

OTHER REFERENCES

"The Chemical Constituents of Petroleum," Sachanen, 1945, pp. 218, 221, 222. (Copy in Div. 31.)

Proceedings of the 24th Annual Meeting, American Petroleum Institute, vol. 24 (III), 1943, pp. 34–48. Article by Forziati et al. (Copy in Div. 31.)

Journal of the American Rocket Society, No. 62, June 1945, pp. 5, 52.

Journal of the Institute of Petroleum, vol. 26, 1940, pp. 294 to 303.

Journal of the American Rocket Society, No. 61, March 1945, pp. 4–6.

Edelman, S. A. E. Quarterly Transactions, vol. 1, No. 2, April 1947, pp. 204–216. (Copy in Scientific Library.)